Patented May 13, 1930

1,758,865

UNITED STATES PATENT OFFICE

FRITZ STRAUB AND HANS MAYER, OF BASEL, AND HERMANN SCHNEIDER, OF RIEHEN, NEAR BASEL, SWITZERLAND, ASSIGNORS TO SOCIETY OF CHEMICAL INDUSTRY IN BASLE, OF BASEL, SWITZERLAND

DYESTUFFS CONTAINING SULPHUR AND CHROMIUM AND PROCESS OF MAKING SAME

No Drawing. Application filed May 2, 1928, Serial No. 274,668, and in Switzerland May 7, 1927.

The present invention relates to new dyestuffs containing sulphur and chromium which are particularly suitable for the production of fast tints on vegetable fibres. It comprises the new dyestuffs, the process of making these dyestuffs, and the material dyed with the new dyestuffs.

It has been found that new dyestuffs are formed which at the same time contain chromium and sulphur, by treating with sulphurizing agents the chromium compounds of azo-dyestuffs which can be chromed, such as for instance the dyestuffs which are formed by uniting the ortho-hydroxy-diazo compounds with any coupling components. The operation may consist in treating the isolated chromiun compounds with the sulphurizing agent, or in treating the azo-dyestuffs capable of being chromed simultaneously with the agents yielding chromium and sulphur.

The new dyestuffs form dark powders which dissolve in sodium sulfide solution with blue-red to blue-green or dark-blue coloration, and in concentrated sulphuric acid with deep green coloration. Their constitution is not known. They may be employed for a variety of purposes, such as, for example, for the production of pigments or for the dyeing of textile goods. In the latter case they are particularly adapted for the dyeing of vegetable fibres, which is due to their property of being dyeable from a sodium suifide bath. They are then producing deep tints which possess remarkable fastness properties.

As agents yielding sulphur there come above all into consideration the salts of the sulphuretted hydrogens, such as salts of the $SH_2$ and of the polysulfides.

The following examples illustrate the new invention, without, however, limiting the same:—

Example 1

Into a solution of 96 parts of sulphur in 240 parts of a crystallized sodium sulfide in 100 parts of water are introduced 60 parts of the chromium compound of the azo-dyestuff of the formula

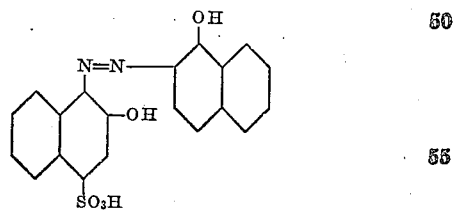

from diazotized 1:2-amino-naphthol-4-sulfonic acid and α-naphthol (made by the process described in U. S. patent specification No. 1,480,640) and the whole is boiled for a long time in a reflux apparatus while stirring. The temperature rises to 104–106° C. The sulphurized dyestuff separates from the liquid after some time. It is filtered and the solid matter is boiled with a common salt solution of 5 per cent strength with addition of some sodium sulfite; it is then filtered, washed with dilute common salt solution and cautiously dried. The new dyestuff thus obtained is a blue-black powder insoluble in water but soluble in alkali sulfide solution to a reddish-blue solution and in concentrated sulphuric acid to a deep green solution. It dyes cotton in a bath containing sodium sulfide reddish blue tints, fast to washing and light.

A similar product is obtained when the chromium compound made with aid of chromium formate or chromium fluoride is used. If the azo-dyestuff is sulphurized without conversion into its chromium compound it is completely destroyed; the protective action of the chromium is surprising.

Example 2

30 parts of the dyestuff containing chromium made from α-naphthol and diazotized 1:2-aminonaphthol-4-sulfonic acid are dissolved in a boiling alcoholic solution of sodium poly-sulfide made from 200 parts of alcohol, 108 parts of crystallized sodium sulfide and 43.2 parts of sulphur, and the solution is boiled for a long time in a deflux apparatus. It is then filtered from inorganic salts and undissolved sulphur while hot, diluted with water and distilled to remove the alcohol. The dyestuff which has separated is then filtered, washed well with water and cautiously dried. The product is a blue-black powder, insoluble in water, but soluble in a sodium sulfide solution to a reddish-blue, and in concentrated sulphuric acid to a deep green solution. It dyes cotton in a bath containing sodium sulfide fast blue tints.

If the operation is conducted with a smaller proportion of diluent a product is obtained which gives a somewhat redder dyeing.

*Example 3*

An aqueous polysulfide solution made from 96 parts of crystallized sodium sulfide and 38.4 parts of sulphur is evaporated to dryness in a vacuum and the product dissolved in 200 parts of amyl-alcohol. To this solution are added 24 parts of the parent material used in Example 1 and the whole is boiled for 18 hours in a reflux apparatus. The new dyestuff thus formed separates in larger part and is filtered and washed. It dissolves sparingly in water, more freely in sodium sulfide solution to a blue solution, in which it dyes cotton blue tints. In concentrated sulphuric acid it dissolves to a deep green solution. Further quantities of a similar dyestuff may be obtained from the filtrate by mixing it with water and evaporating the amyl-alcohol.

*Example 4*

12 parts of the dyestuff made by coupling diazotized 1:2-amino-naphthol-4-sulfonic acid with 5:8-dichloro-1-naphthol of the formula

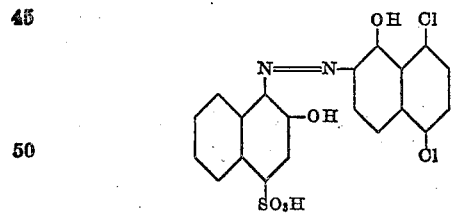

and subsequently chroming in an alkaline medium, are heated with an alcoholic polysulfide solution of 15.6 parts of anhydrous sodium sulfide, 19.2 parts of sulphur and 80 parts of alcohol for 30 hours in a closed vessel at 120-150° C.; the solution thus obtained is filtered and the product worked up in the manner described in Example 2. The new dyestuff is insoluble in water but dissolves in sodium sulfide solution to a blue-green solution, which dyes cotton strong greenish-blue tints, very fast to washing and light. Its solution in concentrated sulphuric acid is olive-green.

If the operation is conducted at the ordinary pressure there are obtained products which are less strongly greenish.

Like products are obtained when the chromium compound of the dyestuff from the brominated diazo-compound of 1:2-aminonaphthol-4-sulfonic acid and 5:8-dichloro-1-naphthol is used.

*Example 5*

120 parts of the chromed azo-dyestuff from diazotized 1:2-aminonaphthol-4-sulfonic acid and α-naphthol are heated with an alcoholic polysulfide solution made from 140.4 parts of calcined sodium sulfide, 172.8 parts of sulphur and 600 parts of alcohol with addition of 5 parts of nitrobenzene-sulfonic acid for 20 hours at 115-120° C. in a closed vessel (pressure 4-4¾ atmospheres). The mass is filtered while hot, the filtrate is diluted with water and the separated dyestuff filtered and washed. When dry the product is a greenish black powder insoluble in water, soluble in sodium sulfide solution to a green-blue solution; the latter dyes cotton pure, somewhat greenish-blue tints of good properties of fastness. It gives with concentrated sulphuric acid a deep green solution.

*Example 6*

In 60 parts of caustic alkali 72.5 parts of chromium hydroxide paste containing 11.8 per cent of $Cr_2O_3$ are cautiously dissolved. Into this solution there are then introduced 45 parts of the reduced dyestuff from the nitrated diazo compound of 1:2:4—aminonaphthol sulfonic acid and α—naphthol of the formula

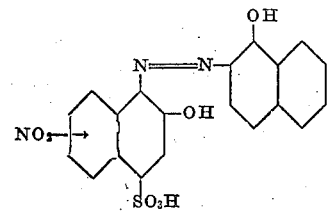

The thick mass is then stirred for 16 hours at 75 to 80° C., whereupon the finished chromium compound is separated by dilution, neutralization with dilute sulphuric acid, and salting out.

55 parts of this dried dyestuff are introduced into an alcoholic polysulfide solution made from 120 parts of calcined sodium sulfide, 96 parts of sulphur and 400 parts of alcohol. The mass is boiled for 110 hours in a vessel provided with a reflux condenser, whereupon the main part of the alcohol is distilled off and the sulphur dyestuff precipitated by dilution with an aqueous solution containing 20 per cent of common salt. It is then filtered, washed with a solution of common salt of 3 per cent strength, and dried. There is thus obtained a blue-black powder which dissolves in the sodium sulfide bath to a blue solution, which dyes cotton grey tints of excellent fastness.

The operation can be conducted similarly by starting from the not reduced chromium compound containing the nitro-group, or from such dyestuffs which contain another group which may be transformed into the $NH_2$-group.

What we claim is:—

1. Process for the manufacture of dyestuffs containing sulphur and chromium, consisting in treating with agents yielding sulphur chromium compounds of azo-dyestuffs capable of being chromed.

2. Process for the manufacture of dyestuffs containing sulphur and chromium, consisting in treating with polysulfides chromium compounds of azo-dyestuffs capable of being chromed.

3. Process for the manufacture of dyestuffs containing sulphur and chromium, consisting in treating with polysulfides chromium compounds of azo-dyestuffs from ortho-hydroxy-diazo compounds and any coupling components capable of being chromed.

4. Process for the manufacture of dyestuffs containing sulphur and chromium, consisting in treating with polysulfides chromium compounds of azo-dyestuffs from ortho-hydroxy-diazo compounds of the naphthalene series and naphthols.

5. As new products the dyestuffs containing sulphur and chromium which are obtained by treating with agents yielding sulphur chromium compounds of azo-dyestuffs capable of being chromed, which dyestuffs may dye cotton from a bath containing sodium sulfide, and which products form dark powders which dissolve in sodium sulfide solution with blue-red to blue-green or dark-blue coloration, and in concentrated sulphuric acid with deep green coloration.

6. As new products the dyestuffs containing sulphur and chromium which are obtained by treating with polysulfides chromium compounds of azo-dyestuffs capable of being chromed, which dyestuffs may dye cotton from a bath containing sodium sulfide, and which products form dark powders which dissolve in sodium sulfide solution with blue-red to blue-green or dark-blue coloration, and in concentrated sulphuric acid with deep green coloration.

7. As new products the dyestuffs containing sulphur and chromium which are obtained by treating with polysulfides chromium compounds of azo-dyestuffs from ortho-hydroxy-diazo compounds and any coupling components capable of being chromed, which dyestuffs may dye cotton from a bath containing sodium sulfide, and which products form dark powders which dissolve in sodium sulfide solution with blue-red to blue-green or dark-blue coloration, and in concentrated sulphuric acid with deep green coloration.

8. As new products the dyestuffs containing sulphur and chromium which are obtained by treating with polysulfides chromium compounds of azo-dyestuffs from ortho-hydroxy-diazo compounds of the naphthalene series and naphthols, which dyestuffs may dye cotton from a bath containing sodium sulfide, and which products form dark powders which dissolve in sodium sulfide solution with blue-red to blue-green or dark-blue coloration, and in concentrated sulphuric acid with deep green coloration.

9. The material dyed with the products of claim 5.

10. The material dyed with the products of claim 6.

11. The material dyed with the products of claim 7.

12. The material dyed with the products of claim 8.

In witness whereof we have hereunto signed our names this 20th day of April 1928.

HANS MAYER.
FRITZ STRAUB.
HERMANN SCHNEIDER.